United States Patent
Gershenson

[11] Patent Number: 6,147,636
[45] Date of Patent: Nov. 14, 2000

[54] SYNTHETIC APERTURE PROCESSING FOR DIFFUSION-EQUATION-BASED TARGET DETECTION

[75] Inventor: Meir Gershenson, Panama City, Fla.

[73] Assignee: The United States of America as represented by the Secretary of the Navy, Washington, D.C.

[21] Appl. No.: 09/374,014

[22] Filed: Aug. 16, 1999

[51] Int. Cl.[7] .............................. G01S 13/90; G01V 3/12
[52] U.S. Cl. .............................. 342/22; 342/25; 342/195
[58] Field of Search ........................... 342/22, 25, 195, 342/196

[56] References Cited

U.S. PATENT DOCUMENTS

| | | | |
|---|---|---|---|
| 3,885,224 | 5/1975 | Klahr | 367/11 |
| 4,008,469 | 2/1977 | Chapman | 342/22 |
| 4,843,597 | 6/1989 | Gjessing et al. | 367/15 |
| 5,488,373 | 1/1996 | Hellsten | 342/25 |
| 5,907,404 | 5/1999 | Marron et al. | 356/360 |
| 5,999,836 | 12/1999 | Nelson et al. | 600/407 |

*Primary Examiner*—John B. Sotomayor
*Attorney, Agent, or Firm*—Harvey A. Gilbert; Donald G. Peck

[57] ABSTRACT

A method and system for target detection processing transmits energetic pulses into a media in which the energetic pulses propagate diffusively. Diffusively propagating reflections of the energetic pulses from a target are transformed into corresponding wave propagating reflections satisfying a conventional wave equation. The wave propagating reflections are then processed in accordance with a synthetic aperture processing technique.

18 Claims, 3 Drawing Sheets

6,147,636

SYNTHETIC APERTURE PROCESSING FOR DIFFUSION-EQUATION-BASED TARGET DETECTION

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to processing returns or reflections in target detection systems, and more particularly to synthetic aperture processing for diffusion-equation-based target detection systems such as electromagnetic sounding systems, thermal wave systems and photon-density wave systems.

BACKGROUND OF THE INVENTION

Synthetic aperture processing/imaging is a well-known enhancement technique used in wave propagation based target-detection systems such as radar, ground penetrating radar or underwater sonar systems. Each of these systems utilizes a wave equation to identify individual returns or reflections through time delay analysis. Synthetic aperture processing/imaging produces high resolution images and improves the signal-to-noise ratio for low level returns or reflections.

Not all target-detection applications can make use of the above-noted wave propagation based systems. For example, objects buried in the sea floor (e.g., mines, sunken vessels, etc.) are traditionally detected using electromagnetic sounding systems which generate images based on electrical conductivity anomalies. Since electromagnetic signals propagate underwater in accordance with a diffusion equation, recognition of individual returns or reflections is difficult. Therefore, use of synthetic aperture processing/imaging with such electromagnetic sounding systems is impossible. As a result, localization and characterization of a buried target can only be achieved by guessing at a model of the target, comparing the reflection with the guessed model, and making a better guess based on the comparison.

SUMMARY OF THE INVENTION

Accordingly, it is an object of the present invention to provide a method and system that uses synthetic aperture processing/imaging in conjunction with target-detection systems that are based on a diffusion equation.

Another object of the present invention is to provide a method and system for detecting objects buried in the sea floor.

Still another object of the present invention is to provide improved processing of returns or reflections generated by underwater electromagnetic sounding systems.

Other objects and advantages of the present invention will become more obvious hereinafter in the specification and drawings.

In accordance with the present invention, a method and system are provided for target detection processing. Energetic pulses are transmitted from a plurality of locations into a media in which the energetic pulses propagate diffusively. When impinging upon a target, diffusively propagating reflections of the energetic pulses are generated. The diffusively propagating reflections are received at a receiver and are transformed into corresponding wave propagating reflections satisfying a conventional wave equation. The wave propagating reflections are then processed in accordance with a synthetic aperture processing technique. The energetic pulses can be electromagnetic, photon-density or thermal in nature.

DETAILED DESCRIPTION OF THE INVENTION

Figure 1:
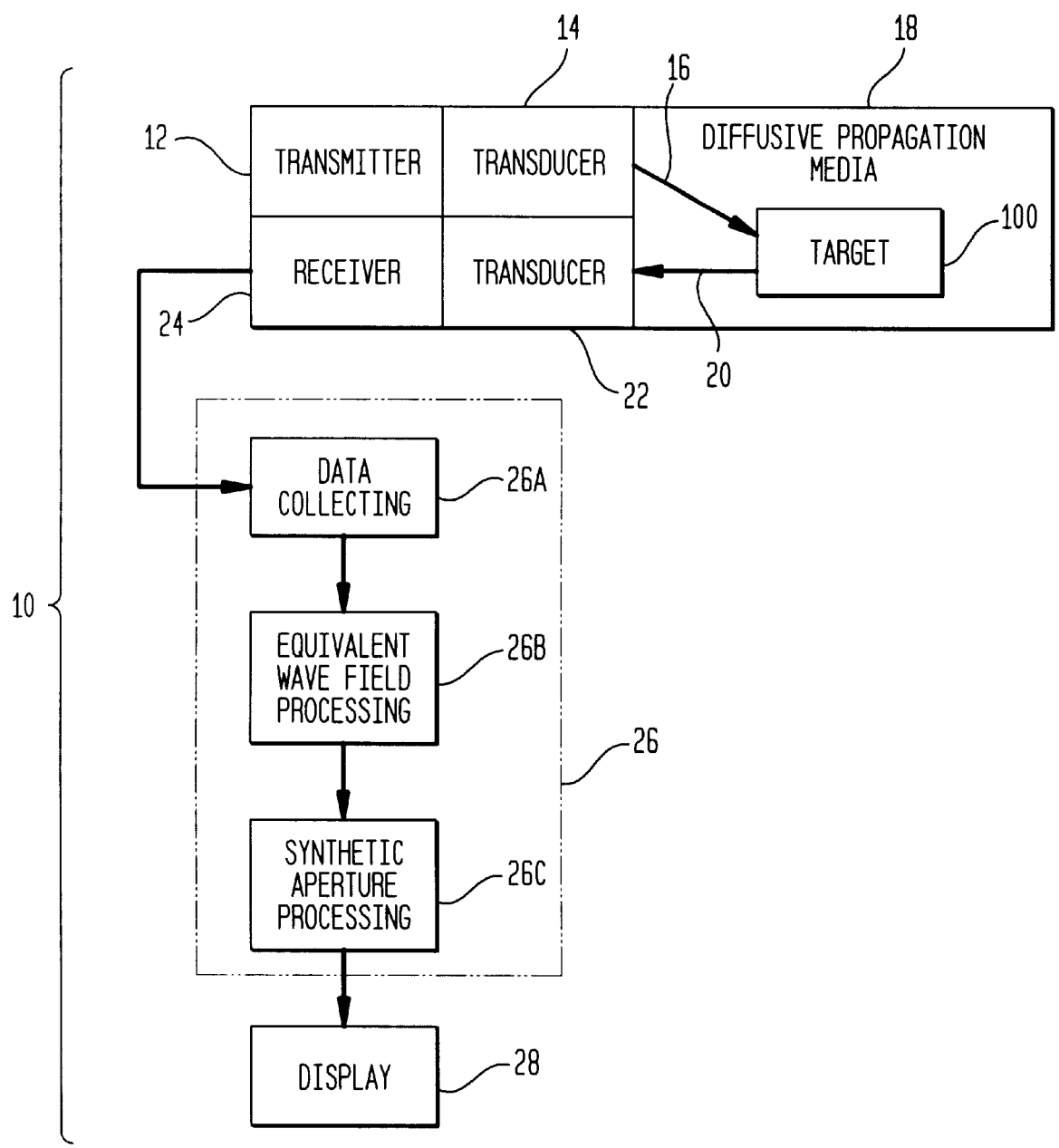
FIG. 1 is a block diagram of a target-detection system in accordance with the present invention.

Referring now to the drawings, and more particularly to FIG. 1, a target-detection system in accordance with the present invention is shown and referenced generally by numeral 10. By way of example, the present invention will be explained with respect to an electromagnetic sounding system used to detect a target 100 located underwater or buried in the sea floor. However, as will be explained further below, the present invention can also be used with other types of target detection systems that use wave energy (e.g., thermal wave or photon-density wave) propagating in diffusive propagation media (e.g., living tissue, living tissue containing blood, the earth, etc.).

Target-detection system 10 includes a transmitter 12 coupled to a transducer 14. When activated, transducer 14 transmits electromagnetic wave pulses (represented by arrow 16) into a diffusive propagation media 18, i.e., a media in which pulses 16 propagate diffusively such as seawater when pulses 16 are electromagnetic. Returns or reflections 20 from target 100 passing back through diffusive propagation media 18 are detected by a (receiving) transducer 22 which is coupled to a receiver 24. The data associated with return/reflections 20 is passed to a processor 26 which performs data collection at 26A, equivalent wave field processing at 26B and synthetic aperture processing at 26C. Briefly, data collection 26A digitizes the electrical signals associated with return/reflections 20 and stores the digital representations in memory for further processing. Equivalent wave field processing 26B transforms the (digitized) diffusively-propagating returns/reflection 20 into corresponding wave propagating reflections suitable for processing by conventional synthetic aperture processing 26C as will be explained further below. The output from processor 26 is supplied to a display 28 which can include a screen display and/or a hard copy display of the data.

In accordance with the method of the present invention, electromagnetic pulses 16 (or any other energetic pulse transmitted into a media that diffusively propagates the energetic pulse) are transmitted into diffusive propagation media 18 from a plurality of locations. For example, in terms of electromagnetic sounding systems, the plurality of locations are typically located along a line as transducer 12 is towed through the water. Returns/reflections 20 propagate diffusively and are received at transducer 22/receiver 24 at a plurality of locations along the tow path and are passed to processor 26.

In general, processor 26 acts to transform the diffusively-propagated returns/reflections 20 into a non-diffusive wave equation equivalent solution. That is, processor 26 transforms diffusively-propagated returns/reflections 20 into an equivalent series resembling time-delayed propagating waves in a non-diffusive media. Such a transformation allows for easy identification of individual reflections. A number of such transformations are described in detail by Meir Gershenson in "Simple Interpretation of Time-Domain Electromagnetic Sounding Using Similarities Between Wave and Diffusion Propagation," Geophysics, Volume 62, No. 3, May-June 1997, pp. 763–774, the contents of which are hereby incorporated by reference.

Figure 2:
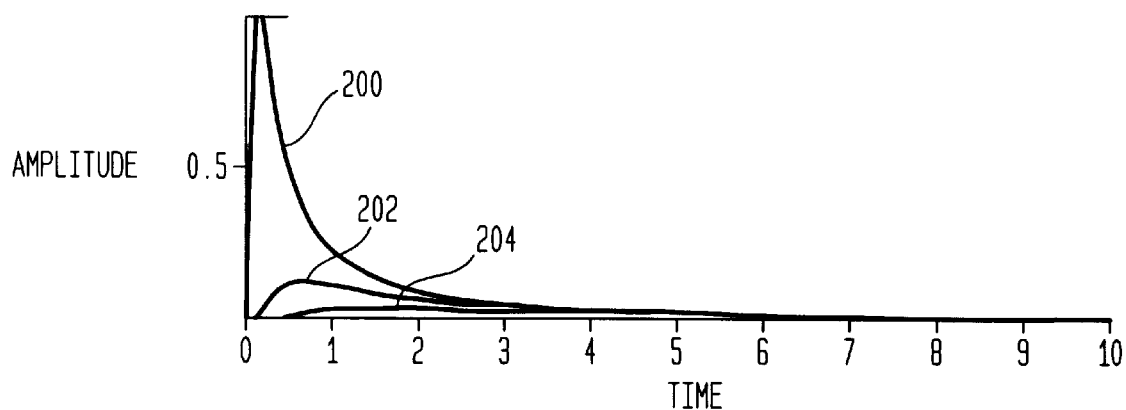
FIG. 2 is an amplitude versus time graph depicting an impulse wave and the resulting wave shapes after propagation in a diffusive media.
Figure 3:
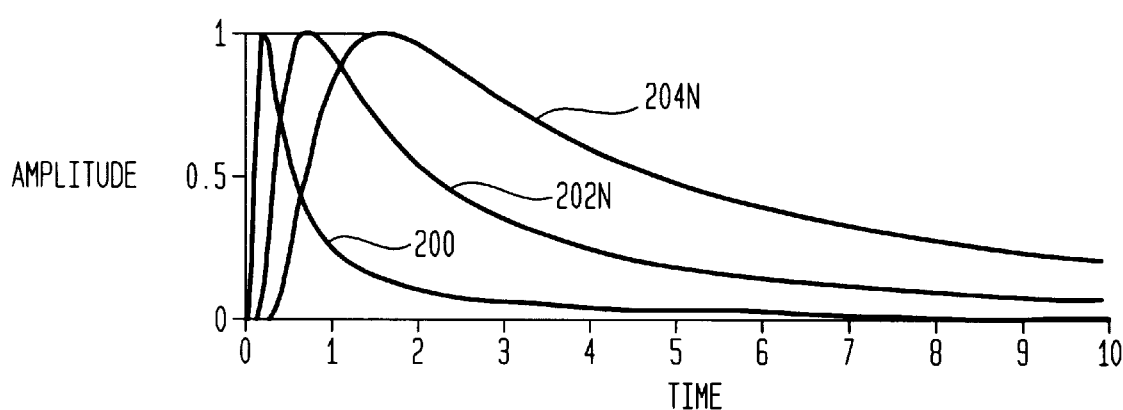
FIG. 3 is an amplitude versus time graph of the curves in FIG. 2 after normalization.
Figure 4:
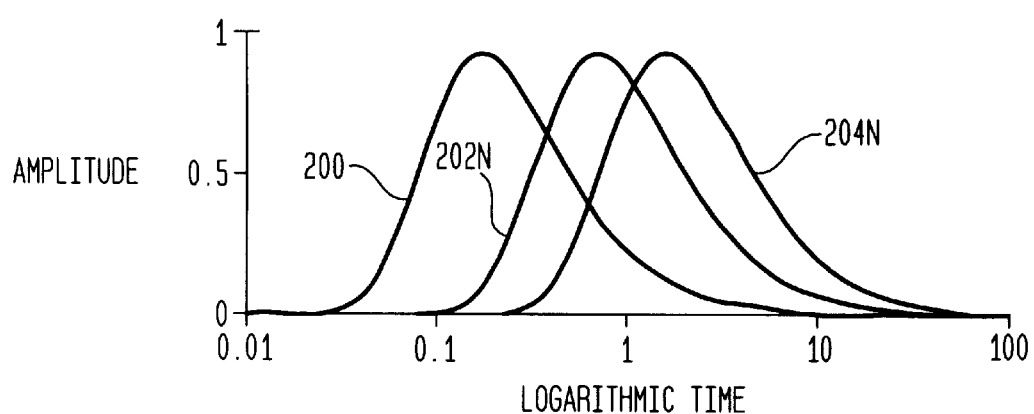
FIG. 4 is an amplitude versus logarithmic time graph of the curves in FIG. 3.
Figure 5:
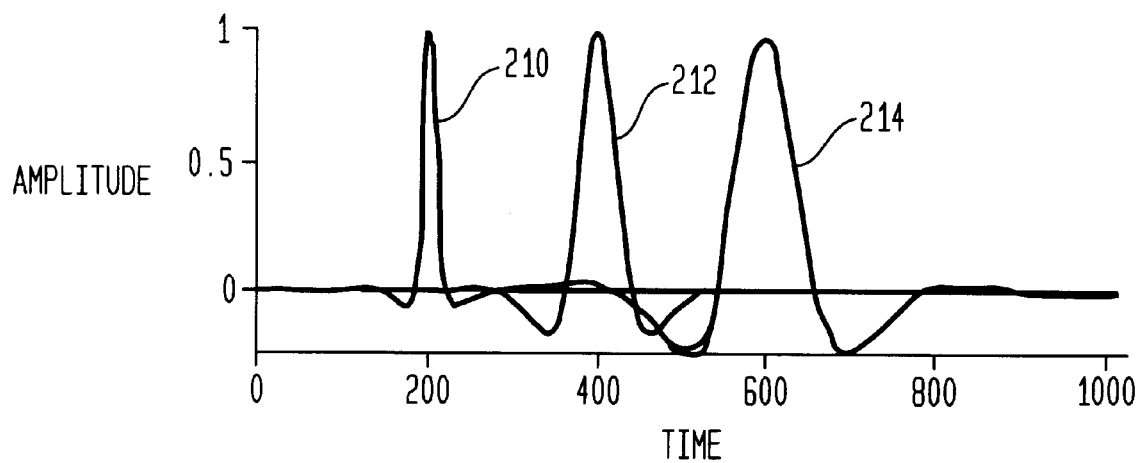
FIG. 5 is an amplitude versus time graph of the curves in FIG. 4 after deconvolution.

By way of example, one transformation suitable for use in the present invention will be described with the aid of FIGS. 2–5 where FIG. 2 depicts an impulse wave at its inception (e.g., the start of a reflection indicated by curve 200) and at subsequent distances after propagation through a diffusive media (e.g., curves 202 and 204). In accordance with the present invention, curves 202 and 204 are first normalized (i.e., amplitude scaled with time) as illustrated by normalized curves 202N and 204N in FIG. 3. As is evident, the propagation effect on the shape of curves 202N and 204N is by dilation of the original reflection curve 200. An equivalent to time-delayed signals can be obtained by plotting curves 200, 202N and 204N on a logarithmic time scale as illustrated in FIG. 4. That is, FIG. 4 illustrates what happens when an exponential time sampling scale is applied to curves 200, 202N, 204N. Since all of the (response) curves have the same shape in FIG. 4, the curves can be deconvolved back to a linear time scale using a standard template to obtain narrow impulse curve 210 (corresponding to curve 200), narrow impulse curve 212 (corresponding to curve 202N) and narrow impulse curve 214 (corresponding to curve 204N) as illustrated in FIG. 5. It is impulse curves 210, 212 and 214 that are processed by conventional signal aperture processing 26C.

Figure 6:
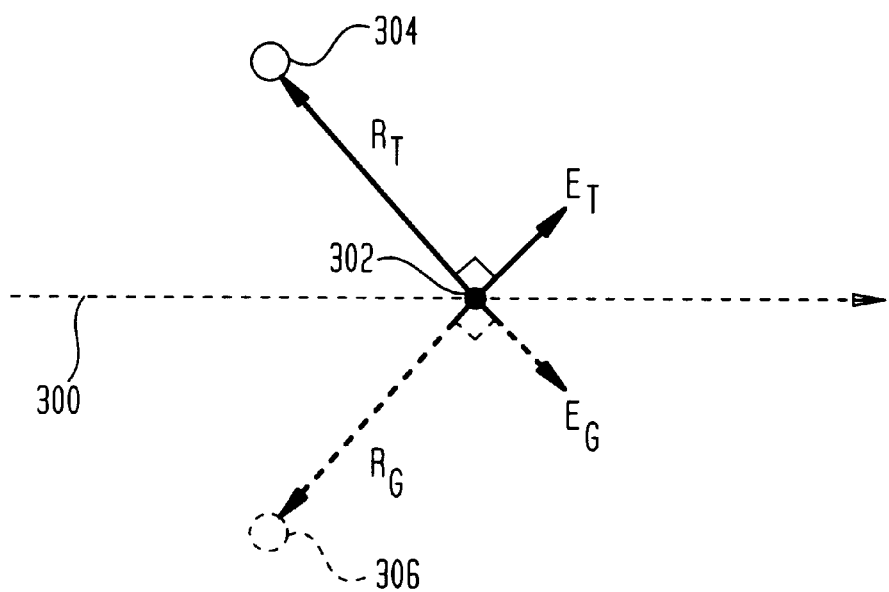
FIG. 6 is a schematic depicting both a target image and ghost image relative to an electromagnetic sounding tow path.

In the illustrated example of the present invention, electromagnetic soundings and receipt-of-reflections occur at a plurality of locations along a line (i.e., the transducer towpath) for two-dimensional inversion or in a plane for three-dimensional inversion. By including a time history, the transducer tow-path can be used to develop a two or three-dimensional data string. If transducer 22 is an antenna with no directional capability and conventional synthetic aperture processing is applied to such one-dimensional data, ghost images of a target will result. This is illustrated in FIG. 6 where dashed line 300 represents a tow path, point 302 represents a location at which a reflection is received, circle 304 represents a real target and dashed-line circle 306 represents a ghost image of target 304. In order to resolve the image ambiguity relative to tow path 300, the present invention applies a polarization scheme to the data.

The polarization scheme is carried out as follows. The electric field E is measured at each receipt-of-reflection location such as point 302. The vector components of electric field E are then determined. Specifically, the electric field vector component of interest is $E_T$ which is orthogonal to a direction vector RT between point 302 and target 304. Relative to ghost image 306, an electric field component $E_G$ and directional vector $R_G$ are shown. In accordance with the polarization scheme of the present invention, cross-products $E_T \times R_T$ and $E_G \times R_G$ are formed. The cross-product result is a positive maximum at the location of target 304 and negative at ghost image 306. Therefore, summing the cross-products enhances target 304 relative to ghost image 306, i.e., an increased positive response versus an increased negative response.

The advantages of the present invention are numerous. Synthetic aperture processing/imaging can now be applied in a target-detection system that is predicated upon diffusive propagation. The present invention will be of great use in electromagnetic target-detection systems or any other target-detection system in which soundings and reflections propagate diffusively.

Although the invention has been described relative to a specific embodiment thereof, there are numerous variations and modifications that will be readily apparent to those skilled in the art in light of the above teachings. For example, electromagnetic pulses can be used with any electrically conductive media such as seawater, the earth, etc. However, as mentioned above, the present invention is not limited to electromagnetic sounding systems. The energetic pulses used for sounding (and reflection) could be thermal or photon-density based. To use thermal pulses, the media must be thermally conductive, e.g., metal. Photon-density pulses can be used in medical target-detection systems where the transmission media is living tissue, e.g., tumor or other tissue abnormality. It is therefore to be understood that, within the scope of the appended claims, the invention may be practiced other than as specifically described.

What is claimed as new and desired to be secured by letters patent of the United States is:

1. A method of target detection processing, comprising the steps of:

transmitting energetic pulses from a plurality of locations into a media in which said energetic pulses propagate diffusively, wherein diffusively propagating reflections of said energetic pulses are generated by a target;

receiving said diffusively propagating reflections;

transforming said diffusively propagating reflections into corresponding wave propagating reflections; and processing said wave propagating reflections in accordance with a synthetic aperture processing technique.

2. A method according to claim 1 wherein said energetic pulses are selected from the group consisting of thermal, photon-density and electromagnetic pulses.

3. A method according to claim 1 wherein said step of transforming comprises the steps of:

normalizing each of said diffusively propagating reflections, wherein normalized reflections are formed;

applying an exponential time scale to each of said normalized reflections, wherein exponential time sampled reflections are formed; and deconvolving said exponential time sampled reflections to form said wave propagating reflections.

4. A method according to claim 1 wherein said energetic pulses are electromagnetic pulses and said media is an electrically conductive media.

5. A method according to claim 4 wherein said electrically conductive media is seawater.

6. A method according to claim 4 wherein said electrically conductive media is living tissue containing blood.

7. A method according to claim 4 wherein said electrically conductive media is the earth.

8. A method according to claim 1 wherein said energetic pulses are photon-density pulses and said media is living tissue.

9. A method according to claim 1 wherein said energetic pulses are thermal pulses and said media is a thermally conductive media.

10. A method of target detection processing, comprising the steps of:

transmitting electromagnetic pulses from a plurality of locations into a media in which said electromagnetic pulses propagate diffusively, wherein diffusively propagating reflections of said electromagnetic pulses are generated by a target;

receiving said diffusively propagating reflections at each of said plurality of locations;

measuring an electric field at each of said plurality of locations;

determining vector components of said electric field measured at each of said plurality of locations;

determining a direction to the target from each of said plurality of locations using said vector components;

transforming said diffusively propagating reflections into corresponding wave propagating reflections; and processing said wave propagating reflections in accordance with a synthetic aperture processing technique.

11. A method according to claim 10 wherein said step of transforming comprises the steps of:

normalizing each of said diffusively propagating reflections, wherein normalized reflections are formed;

applying an exponential time scale to each of said normalized reflections, wherein exponential time sampled reflections are formed; and deconvolving said exponential time sampled reflections to form said wave propagating reflections.

12. A method according to claim 11 wherein said media is seawater.

13. A method according to claim 11 wherein said plurality of locations lie along a line.

14. A method according to claim 11 wherein said plurality of locations lie in a plane.

15. A target detection system, comprising:

a transmitter for transmitting energetic pulses from a plurality of locations into a media in which said energetic pulses propagate diffusively, wherein diffusively propagating reflections of said energetic pulses are generated by a target;

a receiver for receiving said diffusively propagating reflections;

a transformation processor coupled to said receiver for transforming said diffusively propagating reflections into corresponding wave propagating reflections;

a synthetic aperture processor coupled to said transformation processor for processing said wave propagating reflections in accordance with a synthetic aperture processing technique; and an output device coupled to said synthetic aperture processor for displaying results generated by said synthetic processing technique.

16. A system as in claim 15 wherein said media is electrically conductive, and wherein said transmitter includes a transducer generating said energetic pulses in the form of electromagnetic pulses.

17. A system as in claim 15 wherein said media is thermally conductive, and wherein said transmitter includes a transducer generating said energetic pulses in the form of thermal pulses.

18. A system as in claim 15 wherein said media is living tissue, and wherein said transmitter includes a transducer generating said energetic pulses in the form of photon-density pulses.

* * * * *